US009680780B2

(12) United States Patent
Hsieh

(10) Patent No.: US 9,680,780 B2
(45) Date of Patent: Jun. 13, 2017

(54) METHOD FOR IDENTIFYING SPAM MAIL AND MAIL SERVER USING THE SAME

(71) Applicant: Wistron Corporation, New Taipei (TW)

(72) Inventor: Yu-Shan Hsieh, New Taipei (TW)

(73) Assignee: Wistron Corporation, New Taipei (TW)

(*) Notice: Subject to any disclaimer, the term of this patent is extended or adjusted under 35 U.S.C. 154(b) by 168 days.

(21) Appl. No.: 14/663,458

(22) Filed: Mar. 20, 2015

(65) Prior Publication Data

US 2016/0142353 A1 May 19, 2016

(30) Foreign Application Priority Data

Nov. 17, 2014 (TW) ............................. 103139766 A

(51) Int. Cl.
*H04L 12/58* (2006.01)

(52) U.S. Cl.
CPC .............. *H04L 51/12* (2013.01); *H04L 12/58* (2013.01)

(58) Field of Classification Search
CPC ...... H04L 51/00–51/34; H04L 12/58–12/5895
See application file for complete search history.

(56) References Cited

U.S. PATENT DOCUMENTS 7,409,708 B2 8/2008 Goodman et al.
7,490,128 B1 2/2009 White et al.
2003/0172292 A1* 9/2003 Judge .................... G06F 21/554 726/23
2004/0260776 A1* 12/2004 Starbuck ................ H04L 51/12 709/206
2005/0289239 A1* 12/2005 Prakash .................. H04L 51/14 709/238
2007/0185960 A1* 8/2007 Leiba .................. G06Q 10/107 709/206

* cited by examiner

*Primary Examiner* — Nicholas Taylor
*Assistant Examiner* — Clayton R Williams
(74) *Attorney, Agent, or Firm* — Jianq Chyun IP Office

(57) ABSTRACT

A method for identifying a spam mail and a mail server using the method are provided. The method includes: when receiving a mail, retrieving a mail header of the mail; obtaining reference servers from a received line of the mail header; obtaining mail forwarding information of a mail forwarding host of each of the reference servers, and obtaining mail receiving information of a mail receiving host of each of the reference servers; comparing the mail forwarding information of an i-th reference server with the mail receiving information of an (i–1)-th reference server; and when the mail forwarding information of the i-th reference server is completely different from the mail receiving information of the (i–1)-th reference server, identifying the mail as the spam mail.

18 Claims, 3 Drawing Sheets

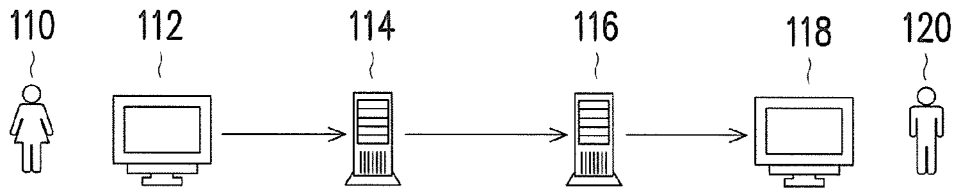

FIG. 1

Authentication-Results:
Content-Type:
DKIM-Signature:
Date: Tue, 16 Oct 2012 07:00:59 +0000 [2012/10/16 15時00分59秒 CST]
Delivered-To: 10057007@ntou.edu.tw
From: Dropbox <no-reply@dropbox.com>
MIME-Version: 1.0
Message-Id: <20121016070059.F102880086@snt-web754.sjc.dropbox.com>

Received:
from mg2.ntou.edu.tw (unknown [192.168.1.11])
by ms1.ntou.edu.tw (Postfix) with ESMTP id 072A71FAA48
for <10057007@ms1.ntou.edu.tw>;
Tue, 16 Oct 2012 15:05:24 +0800 (CST)
Received:
from mg2.ntou.edu.tw ([127.0.0.1])
by localhost (mg2.ntou.edu.tw [127.0.0.1]) (amavisd-new, port 10024) with ESMTP id p6i3mK3Otxny
for <10057007@ms1.ntou.edu.tw>;
Tue, 16 Oct 2012 15:04:43 +0800 (CST)
Received:
from sjc-smtp4.sjc.dropbox.com (sjc-smtp4.sjc.dropbox.com [199.47.219.174])
by mg2.ntou.edu.tw (Postfix) with ESMTP id 324442CE0FDA
for <10057007@mail.ntou.edu.tw>;
Tue, 16 Oct 2012 15:01:01 +0800 (CST)
Received:
from snt-web754.sjc.dropbox.com (snt-web754.sjc.dropbox.com [10.12.11.167])
by sjc-smtp4.sjc.dropbox.com (Postfix) with ESMTP id 004F070AEDD
for <10057007@mail.ntou.edu.tw>;
Tue, 16 Oct 2012 07:01:00 +0000 (UTC)
Received:
from snt-web754.sjc.dropbox.com (localhost [127.0.0.1])
by snt-web754.sjc.dropbox.com (Postfix) with ESMTP id F102880086
for <10057007@mail.ntou.edu.tw>;
Tue, 16 Oct 2012 07:00:59 +0000 (UTC)

210

Return-Path: <no-reply@dropbox.com>
Subject: Verify your school email to join the Dropbox Space Race!
To: 10057007@mail.ntou.edu.tw

FIG. 2

METHOD FOR IDENTIFYING SPAM MAIL AND MAIL SERVER USING THE SAME

CROSS-REFERENCE TO RELATED APPLICATION

This application claims the priority benefit of Taiwan application serial no. 103139766, filed on Nov. 17, 2014. The entirety of the above-mentioned patent application is hereby incorporated by reference herein and made a part of this specification.

BACKGROUND OF THE INVENTION

Field of the Invention

The invention relates to a method for identifying mails and a server thereof, and particularly relates to a method for identifying spam mails and a mail server using the method.

Description of Related Art

With reference to FIG. 1, FIG. 1 is a schematic diagram illustrating a conventional method of forwarding a mail. As shown in FIG. 1, when the mail is sent by a user 110, the mail is delivered to a mail transfer agent (MTA) server 114 via a mail user agent (MUA) server 112. The MTA 114 sends the mail to a MTA 116 of a recipient 120 according to a mail address (other MTAs may exist between the MTA 114 and the MTA 116 for forwarding the mail), and then the mail is forwarded to a MUA 118 of the recipient 120.

The conventional methods for identifying spam mails can be roughly categorized into two types: 1. verification based on domain name system (DNS); and 2. identification based on mail transfer path.

According to the first type, when the MTA at the recipient end (e.g., the MTA 116) receives the mail, the Internet protocol (IP) address and domain name of the sender are looked up through DNS resolution and DNS reverse resolution. If the result does not match the Helo domain of the mail, the mail is identified as a spam mail.

DNS can be used for converting between domain name and IP address. DNS resolution is to look up the IP address to obtain the corresponding domain name when the IP address is registered. DNS reverse resolution is to look up the domain name to obtain the corresponding IP address when the domain name is registered. The Helo domain is the hostname declared by the MTA.

On the other hand, the principle of the second type lies in analyzing the MTA history behavior through a path message in the received field of the mail header. With reference to FIG. 2, FIG. 2 is a schematic diagram of a conventional mail header. Among the received fields of a received line 210 circled by the dotted line in FIG. 2, the received fields on the lower side are closer to the sender while the received fields on the upper side are closer to the recipient.

Mail sets that have been labeled may be divided into spam mails or legitimate mails. Next, the IP addresses corresponding to all the MTAs in the received fields may be obtained, and the frequencies that the IP addresses show in the spam mails and the legitimate mails are analyzed to obtain statistics to evaluate credibility of the MTAs. Then, if a mail is received from a MTA with higher credibility, the mail is labeled as a legitimate mail; otherwise, the mail is labeled as a spam mail.

According to the first type; however, DNS may misidentify some MTAs, which declare erroneous domain name setting, as spam mail servers. Meanwhile, the second type requires history evaluation (e.g., credibility) for determining whether a mail is a spam mail.

In fact, the domain names declared by many MTAs and the domains registered by the IP addresses may have errors due to mistakes made by the setting staff, which may result in misidentification of some mails as spam mails.

SUMMARY OF THE INVENTION

The invention provides a method for identifying a spam mail and a mail server using the method for improving the reliability of mail analysis. Moreover, according to the method and the mail server of the invention, identification is made by analyzing the continuity of a mail path and thus the accuracy of spam mail identification is improved without use of history evaluation.

The invention provides a method for identifying a spam mail, adapted for a mail server. The method includes: retrieving a mail header of a mail when receiving the mail; obtaining a plurality of reference servers from a received line of the mail header, wherein each of the reference servers is a mail transfer agent server, and the reference servers transfer the mail according to a sequence; obtaining a plurality of pieces of mail forwarding information of a mail forwarding host and a plurality of pieces of mail receiving information of a mail receiving host of each of the reference servers; comparing the pieces of the mail forwarding information of an i-th reference server with the pieces of the mail receiving information of an (i−1)-th reference server of the reference servers, wherein i is a positive integer; and identifying the mail as the spam mail if the pieces of the mail forwarding information of the i-th reference server are completely different from the pieces of the mail receiving information of the (i−1)-th reference server.

In an embodiment of the invention, the reference servers are all servers that forward the mail.

In an embodiment of the invention, the step of obtaining the reference servers from the received line of the mail header includes: analyzing the mail header to find all the servers that forward the mail; determining whether a subset exists in the received line, wherein the subset includes a plurality of specific servers that belong to the same domain among the servers; and adopting one of the specific servers as the reference server that represents the specific servers if the subset exists in the received line.

In an embodiment of the invention, the step of comparing the pieces of the mail forwarding information of the i-th reference server with the pieces of the mail receiving information of the (i−1)-th reference server of the reference servers includes: determining whether one of the pieces of the mail forwarding information of the i-th reference server matches one of the pieces of the mail receiving information of the (i−1)-th reference server.

In an embodiment of the invention, the pieces of the mail forwarding information of the i-th reference server include a first Helo domain, a first Internet protocol address, and a first Internet protocol domain of the mail forwarding host of the i-th reference server. The pieces of the mail receiving information of the (i−1)-th reference server include a second Helo domain, a second Internet protocol address, and a second Internet protocol domain of the mail receiving host of the (i−1)-th reference server.

In an embodiment of the invention, the step of determining whether one of the pieces of the mail forwarding information of the i-th reference server matches one of the pieces of the mail receiving information of the (i−1)-th reference server includes: reversely resolving the first Helo domain and the first Internet protocol domain to obtain a plurality of first addresses; reversely resolving the second Helo domain and the second Internet protocol domain to obtain a plurality of second addresses; and determining whether one of the first addresses and the first Internet protocol address matches one of the second addresses and the second Internet protocol address.

In an embodiment of the invention, the step of determining whether one of the first addresses and the first Internet protocol address matches one of the second addresses and the second Internet protocol address includes: retrieving a plurality of first partial addresses from the first Internet protocol address and the first addresses respectively; retrieving a plurality of second partial addresses from the second Internet protocol address and the second addresses respectively; and determining whether one of the first partial addresses matches one of the second partial addresses.

In an embodiment of the invention, the step of determining whether one of the pieces of the mail forwarding information of the i-th reference server matches one of the pieces of the mail receiving information of the (i−1)-th reference server includes: resolving the first Internet protocol address to obtain a first domain name; resolving the second Internet protocol address to obtain a second domain name; and determining whether one of the first domain name, the first Helo domain, and the first Internet protocol domain matches one of the second domain name, the second Helo domain, and the second Internet protocol domain.

In an embodiment of the invention, the step of determining whether one of the first domain name, the first Helo domain, and the first Internet protocol domain matches one of the second domain name, the second Helo domain, and the second Internet protocol domain includes: retrieving a plurality of first base domain names from the first Helo domain, the first domain name, and the first Internet protocol domain respectively; retrieving a plurality of second base domain names from the second Helo domain, the second domain name, and the second Internet protocol domain respectively; and determining whether one of the first base domain names matches one of the second base domain names.

In an embodiment of the invention, the method further includes: defining that continuity exists between the i-th reference server and the (i−1)-th reference server if one of the pieces of the mail forwarding information of the i-th reference server matches one of the pieces of the mail receiving information of the (i−1)-th reference server; and identifying the mail as a normal mail if the continuity exists between any two consecutive reference servers of the reference servers.

The invention provides a mail server that includes a storage unit and a processing unit. The storage unit stores a plurality of modules. The processing unit is coupled to the storage unit and accesses and executes the modules. The modules include a retrieving module, a first obtaining module, a second obtaining module, a comparing module, and an identifying module. The retrieving module retrieves a mail header of a mail when receiving the mail. The first obtaining module obtains a plurality of reference servers from a received line of the mail header. Each of the reference servers is a mail transfer agent server, and the reference servers transfer the mail according to a sequence. The second obtaining module obtains a plurality of pieces of mail forwarding information of a mail forwarding host and a plurality of pieces of mail receiving information of a mail receiving host of each of the reference servers. The comparing module compares the pieces of the mail forwarding information of an i-th reference server with the pieces of the mail receiving information of an (i−1)-th reference server of the reference servers, wherein i is a positive integer. The identifying module identifies the mail as a spam mail if the pieces of the mail forwarding information of the i-th reference server are completely different from the pieces of the mail receiving information of the (i−1)-th reference server.

In an embodiment of the invention, the reference servers are all servers that forward the mail.

In an embodiment of the invention, the first obtaining module is configured to: analyze the mail header to find all the servers that forward the mail; determine whether a subset exists in the received line, wherein the subset includes a plurality of specific servers that belong to the same domain among the servers; and adopt one of the specific servers as the reference server that represents the specific servers if the subset exists in the received line.

In an embodiment of the invention, the comparing module is configured to: determine whether one of the pieces of the mail forwarding information of the i-th reference server matches one of the pieces of the mail receiving information of the (i−1)-th reference server.

In an embodiment of the invention, the pieces of the mail forwarding information of the i-th reference server include a first Helo domain, a first Internet protocol address, and a first Internet protocol domain of the mail forwarding host of the i-th reference server. The pieces of the mail receiving information of the (i−1)-th reference server include a second Helo domain, a second Internet protocol address, and a second Internet protocol domain of the mail receiving host of the (i−1)-th reference server.

In an embodiment of the invention, the comparing module is configured to: reversely resolve the first Helo domain and the first Internet protocol domain to obtain a plurality of first addresses; reversely resolve the second Helo domain and the second Internet protocol domain to obtain a plurality of second addresses; and determine whether one of the first addresses and the first Internet protocol address matches one of the second addresses and the second Internet protocol address.

In an embodiment of the invention, the comparing module is configured to: retrieve a plurality of first partial addresses from the first Internet protocol address and the first addresses respectively; retrieve a plurality of second partial addresses from the second Internet protocol address and the second addresses respectively; and determine whether one of the first partial addresses matches one of the second partial addresses.

In an embodiment of the invention, the comparing module is configured to: resolve the first Internet protocol address to obtain a first domain name; resolve the second Internet protocol address to obtain a second domain name; and determine whether one of the first domain name, the first Helo domain, and the first Internet protocol domain matches one of the second domain name, the second Helo domain, and the second Internet protocol domain.

In an embodiment of the invention, the comparing module is configured to: retrieve a plurality of first base domain names from the first Helo domain, the first domain name, and the first Internet protocol domain respectively; retrieve a plurality of second base domain names from the second Helo domain, the second domain name, and the second Internet protocol domain respectively; and determine whether one of the first base domain names matches one of the second base domain names.

In an embodiment of the invention, the identifying module is configured to define that continuity exists between the i-th reference server and the (i−1)-th reference server if one of the pieces of the mail forwarding information of the i-th reference server matches one of the pieces of the mail receiving information of the (i−1)-th reference server; and identify the mail as a normal mail if the continuity exists between any two consecutive reference servers of the reference servers.

Based on the above, according to the method and the mail server disclosed by the embodiments of the invention, whether a mail is a spam mail is determined based on the continuity between the reference servers. If no continuity exists between any two consecutive reference servers, the mail is identified as a spam mail.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 1 is a schematic diagram illustrating a conventional method of forwarding a mail.

FIG. 2 is a schematic diagram of a conventional mail header.

DESCRIPTION OF THE EMBODIMENTS

Figure 3:
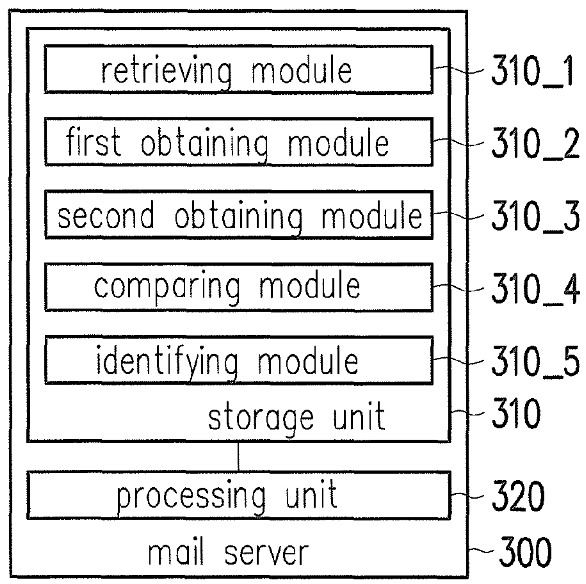
FIG. 3 is a functional block diagram illustrating a mail server according to an embodiment of the invention.

FIG. 3 is a functional block diagram illustrating a mail server according to an embodiment of the invention. In this embodiment, a mail server 300 is an MUA (mail user agent) or other servers that are configured to process e-mails, for example. The mail server 300 includes a storage unit 310 and a processing unit 320. The storage unit 310 is a memory, a hard drive, or any device used for storing data, for example, and is capable of recording a plurality of program codes or modules.

The processing unit 320 is coupled to the storage unit 310. The processing unit 320 is a processor for general use, a processor for special use, a traditional processor, a digital signal processor, multiple microprocessors, one or multiple microprocessors combined with a digital signal processor core, a controller, a microcontroller, an application specific integrated circuit (ASIC), a field programmable gate array (FPGA) circuit, any other type of integrated circuit, a state machine, a processor based on an advanced RISC machine (ARM), or the like, for example.

In this embodiment, the processing unit 320 accesses a retrieving module 310_1, a first obtaining module 310_2, a second obtaining module 310_3, a comparing module 310_4, and an identifying module 310_5, which are stored in the storage unit 310, for executing a spam mail identifying method of the invention.

Figure 4:
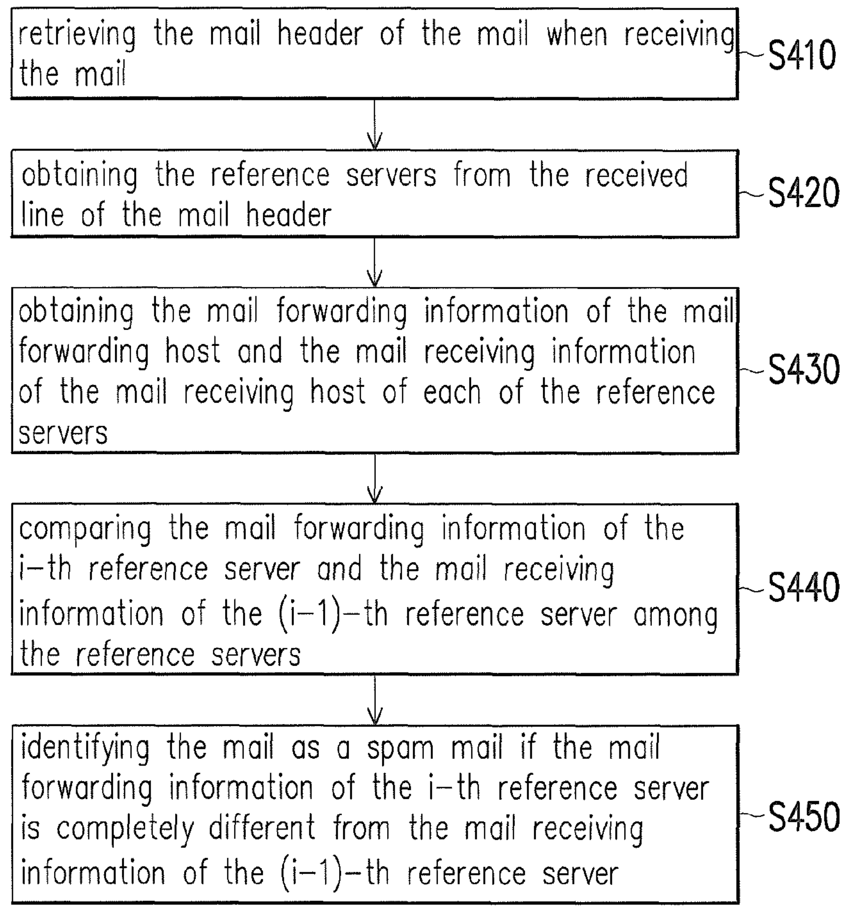
FIG. 4 is a flowchart illustrating a method of identifying a spam mail according to an embodiment of the invention.

FIG. 4 is a flowchart illustrating the method of identifying a spam mail according to an embodiment of the invention. The method disclosed in this embodiment may be executed by the mail server 300 of FIG. 3. Below steps of the method are described in detail with reference to the elements shown in FIG. 3.

In Step S410, when a mail is received, the retrieving module 310_1 retrieves a mail header (as shown in FIG. 2, for example) of the mail. Then, in Step S420, the first obtaining module 310_2 obtains a plurality of reference servers from a received line of the mail header. Each of the reference servers may be an MTA (mail transfer agent) and transfer the mail based on a sequence. In an embodiment, the reference servers refer to all the servers that forward the mail, for example. Take FIG. 1 as an example, the reference servers include an MTA 114 and an MTA 116, for example, which sequentially transfer the mail from a user 110 to a recipient 120. However, it should be noted that the invention is not limited thereto.

In Step S430, the second obtaining module 310_3 obtains a plurality of pieces of mail forwarding information of a mail forwarding host and a plurality of pieces of mail receiving information of a mail receiving host of each of the reference servers. Specifically, the second obtaining module 310_3 obtains the information of Step S430 from a received field corresponding to each reference server.

For an i-th reference server, the mail forwarding host corresponding thereto is an (i−1)-th reference server, which forwards the mail to the i-th reference server. The mail forwarding information of this mail forwarding host includes a Helo domain, an IP address, and an IP domain thereof, for example. In this embodiment, it is given that the number of the reference servers is N, and i represents any positive integer between 1 and N.

On the other hand, the mail receiving host corresponding to the i-th reference server is an (i+1)-th reference server, which receives the mail forwarded by the i-th reference server. The mail forwarding information of this mail receiving host includes the Helo domain, IP address, and IP domain thereof, for example.

After the second obtaining module 310_3 obtains the mail forwarding information and the mail receiving information corresponding to each of the reference servers, in Step S440, the comparing module 310_4 compares the mail forwarding information of the i-th reference server and the mail receiving information of the (i−1)-th reference server among the reference servers.

In Step S450, if the mail forwarding information of the i-th reference server is completely different from the mail receiving information of the (i−1)-th reference server, the identifying module 310_5 identifies the mail as a spam mail.

Specifically, if the mail forwarding information of the i-th reference server is completely different from the mail receiving information of the (i−1)-th reference server, it indicates that the i-th reference server and the (i−1)-th reference server have no continuity therebetween. That is, a receiving source of the i-th reference server is inconsistent with a forwarding destination of the (i−1)-th reference server. In such a case, the identifying module 310_5 identifies the mail as a spam mail.

From another aspect, unless the setting staff of the i-th reference server and/or the (i−1)-th reference server causes too many errors or makes other mistakes when setting the aforementioned information, the probability of complete inconsistency between the mail forwarding information of the i-th reference server and the mail receiving information of the (i−1)-th reference server is very low. That is, by executing the method of the invention, even if the setting staff causes some setting errors, the mail would not be identified as a spam mail easily as long as the errors do not result in complete inconsistency between the mail forwarding information of the i-th reference server and the mail receiving information of the (i−1)-th reference server. Thus, the probability of misidentifying the mail as a spam mail is significantly reduced.

In other embodiments, if one of the pieces of the mail forwarding information of the i-th reference server matches one of the pieces of the mail receiving information of the (i−1)-th reference server, the identifying module 310_5 defines that continuity exists between the i-th reference server and the (i−1)-th reference server. That is, the receiving source of the i-th reference server is consistent with the forwarding destination of the (i−1)-th reference server. If continuity exists between any two consecutive reference servers of the reference servers, the identifying module 310_5 identifies the mail as a normal mail.

In other words, by reasonably loosening the standard for determining the continuity between the reference servers, the method of the invention prevents spam mail misidentification caused by human errors and thereby improves the reliability of mail analysis. In addition, the method of the invention improves the accuracy of spam mail identification without history evaluation of the reference servers.

In other embodiments, Step S440 may be implemented in various ways, which are respectively explained hereinafter. To facilitate the explanation, the mail forwarding information of the i-th reference server is represented by "$f_i$=(heloDomain$_i^f$, ip$_i^f$, ipDomain$_i^f$)", wherein "heloDomain$_i^f$", "ip$_i^f$", and "ipDomain$_i^f$" respectively represent the Helo domain, the IP address, and the IP domain of the mail forwarding host of the i-th reference server. Moreover, the mail receiving information of the (i−1)-th reference server is represented by "$b_{i-1}$=(heloDomain$_{i-1}^b$, ip$_{i-1}^b$, ipDomain$_{i-1}^b$)", wherein "heloDomain$_{i-1}^b$", "ip$_{i-1}^b$", and "ipDomain$_{i-1}^b$" respectively represent the Helo domain, the IP address, and the IP domain of the mail receiving host of the (i−1)-th reference server.

Specifically, the comparing module 310_4 determines whether one of the pieces of mail forwarding information of the i-th reference server matches one of the pieces of the mail receiving information of the (i−1)-th reference server.

In the first embodiment, to facilitate comparison between the information of "$f_i$" and "$b_{i-1}$", the comparing module 310_4 first converts each domain to the corresponding IP address by DNS reverse resolution, for example. More specifically, the comparing module 310_4 reversely resolves "heloDomain$_i^f$" and "ipDomain$_i^f$" to obtain a plurality of first addresses. Then, the comparing module 310_4 reversely resolves "heloDomain$_{i-1}^b$" and "ipDomain$_{i-1}^b$" to obtain a plurality of second addresses.

After that, the comparing module 310_4 determines whether one of the first addresses and "ip$_i^f$" matches one of the second addresses and "ip$_{i-1}^b$". If the result is YES, the comparing module 310_4 determines that continuity exists between the i-th reference server and the (i−1)-th reference server.

In the second embodiment, the method of the first embodiment is further improved to reduce the amount of computation required for making the determination. For example, the comparing module 310_4 retrieves a plurality of first partial addresses from "ip$_i^f$" and the first addresses respectively. The first partial addresses are partial addresses of the first 16 bits of "ip$_i^f$" and the first addresses, for example. However, it should be noted that the invention is not limited thereto. For example, if "ip$_i^f$" is "140.121.196.101", the corresponding first partial address may be "140.121", namely the first 16 bits of "ip$_i^f$". Likewise, the comparing module 310_4 retrieves a plurality of second partial addresses from "ip$_{i-1}^b$" and the second addresses respectively. Then, the comparing module 310_4 determines whether one of the first partial addresses matches one of the second partial addresses. If the result is YES, the comparing module 310_4 determines that continuity exists between the i-th reference server and the (i−1)-th reference server.

In the third embodiment, to facilitate comparison between the information of "$f_i$" and "$b_{i-1}$", the comparing module 310_4 first converts each IP address to the corresponding domain by DNS resolution, for example (contrary to the method of the first embodiment). More specifically, the comparing module 310_4 resolves "ip$_i^f$" to obtain a first domain name and resolves "ip$_{i-1}^b$" to obtain a second domain name. Next, the comparing module 310_4 determines whether one of the first domain name, "heloDomain$_i^f$", and "ipDomain$_i^f$" matches one of the second domain name, "heloDomain$_{i-1}^b$", and "ipDomain$_{i-1}^b$". If the result is YES, the comparing module 310_4 determines that continuity exists between the i-th reference server and the (i−1)-th reference server.

Furthermore, in the fourth embodiment, the method of the third embodiment is further improved to reduce the amount of computation required for making the determination. For example, the comparing module 310_4 retrieves a plurality of first base domain names from the first domain name, "heloDomain$_i^f$", and "ipDomain$_i^f$". If the first domain name is "mx.google.com", the first base domain name corresponding thereto may be "google.com". However, it should be noted that the invention is not limited thereto. Similarly, the comparing module 310_4 retrieves a plurality of second base domain names from the second domain name, "heloDomain$_{i-1}^b$", and "ipDomain$_{i-1}^b$". Then, the comparing module 310_4 determines whether one of the first base domain names matches one of the second base domain names. If the result is YES, the comparing module 310_4 determines that continuity exists between the i-th reference server and the (i−1)-th reference server.

In other embodiments, if consecutive specific servers that belong to the same domain (namely, internal nodes in the same domain) are found among the reference servers, since these specific servers certainly have continuity therebetween, the invention may exclude a portion of these specific servers to reduce the amount of computation by the following method.

Specifically, the first obtaining module 310_2 analyzes the mail header of the mail to find all the servers that forward the mail. Then, the first obtaining module 310_2 determines whether a subset exists in the received line. The subset includes a plurality of specific servers that belong to the same domain among the servers. If the subset exists in the received line, the first obtaining module 310_2 adopts one of the specific servers as a reference server representing the specific servers.

Figure 5:
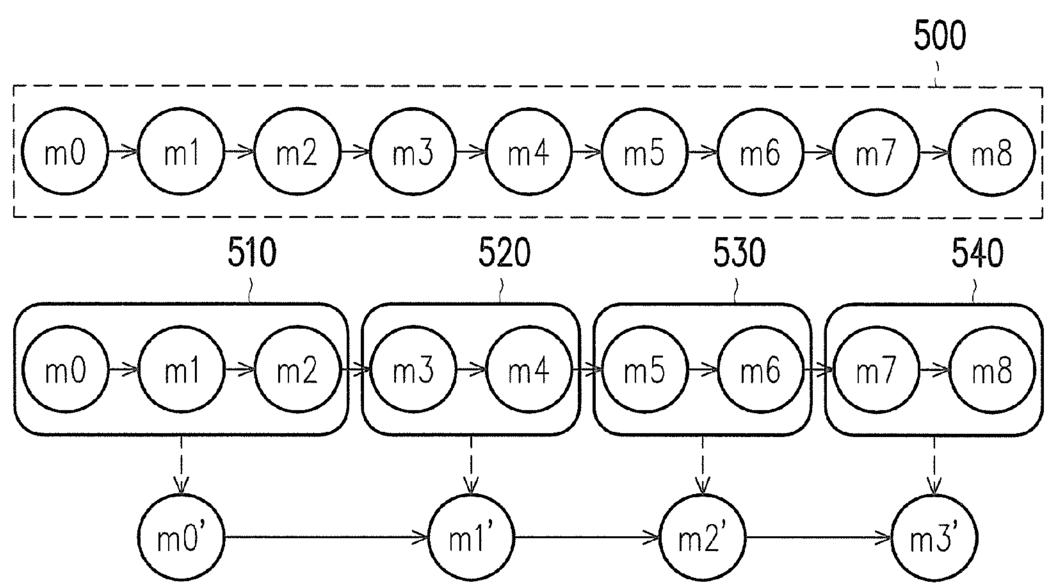
FIG. 5 is a schematic diagram illustrating a received line according to an embodiment of the invention.

With reference to FIG. 5, FIG. 5 is a schematic diagram illustrating the received line according to an embodiment of the invention. In this embodiment, a received line 500 includes servers m0-m8, which are all the servers used for transferring the mail. In the received line 500, it is given that the servers m0-m2 belong to a first domain, the servers m3-m4 belong to a second domain, the servers m5-m6 belong to a third domain, and the servers m7-m8 belong to a fourth domain. In other words, the servers m0-m2 constitute a subset 510; the servers m3-m4 constitute a subset 520; the servers m5-m6 constitute a subset 530; and the servers m7-m8 constitute a subset 540.

Since the first obtaining module 310_2 determines that the subsets 510-540 exist in the received line 500, for the subsets 510-540, the first obtaining module 310_2 adopts one of the servers included in each subset to respectively serve as reference servers m0'-m3' that represent the servers in the subsets.

After using the reference servers m0'-m3' to represent the servers m0-m8, the amount of information for determining whether the mail is a spam mail is significantly reduced. Therefore, the efficiency of the method of the invention is greatly improved.

To sum up, according to the method and the mail server disclosed by the embodiments of the invention, whether a mail is a spam mail is determined based on the continuity between the reference servers. If no continuity exists between any two consecutive reference servers, the mail is identified as a spam mail. In addition, if continuity exists between all the reference servers, the mail is identified as a normal mail.

By reasonably loosening the standard for determining the continuity between the reference servers, the method of the invention prevents mail misidentification caused by human errors and thereby improves the reliability of mail analysis. Moreover, the method of the invention improves the accuracy of spam mail identification without history evaluation of the reference servers.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A spam mail identifying method for a mail server, the spam mail identifying method comprising:

retrieving a mail header of a mail when receiving the mail;

obtaining a plurality of reference servers from a received line of the mail header, wherein each of the reference servers is a mail transfer agent server, and the reference servers transfer the mail according to a sequence;

obtaining a plurality of pieces of mail forwarding information of a mail forwarding host and a plurality of pieces of mail receiving information of a mail receiving host of each of the reference servers;

comparing the pieces of the mail forwarding information of an i-th reference server with the pieces of the mail receiving information of an (i−1)-th reference server of the reference servers, wherein i is a positive integer; and identifying the mail as a spam mail if the pieces of the mail forwarding information of the i-th reference server are inconsistent from the pieces of the mail receiving information of the (i−1)-th reference server, wherein the step of obtaining the reference servers from the received line of the mail header comprises:

analyzing the mail header to find all servers that forward the mail;

determining whether a subset exists in the received line, wherein the subset comprises a plurality of specific servers that belong to a same domain among the servers; and adopting one of the specific servers as a reference server that represents the specific servers if the subset exists in the received line.

2. The spam mail identifying method according to claim 1, wherein the reference servers are all servers that forward the mail.

3. The spam mail identifying method according to claim 1, wherein the step of comparing the pieces of the mail forwarding information of the i-th reference server with the pieces of the mail receiving information of the (i−1)-th reference server of the reference servers comprises:

determining whether one of the pieces of the mail forwarding information of the i-th reference server matches one of the pieces of the mail receiving information of the (i−1)-th reference server.

4. The spam mail identifying method according to claim 3, wherein the pieces of the mail forwarding information of the i-th reference server comprise a first Helo domain, a first Internet protocol address, and a first Internet protocol domain of the mail forwarding host of the i-th reference server; and the pieces of the mail receiving information of the (i−1)-th reference server comprise a second Helo domain, a second Internet protocol address, and a second Internet protocol domain of the mail receiving host of the (i−1)-th reference server.

5. The spam mail identifying method according to claim 4, wherein the step of determining whether one of the pieces of the mail forwarding information of the i-th reference server matches one of the pieces of the mail receiving information of the (i−1)-th reference server comprises:

reversely resolving the first Helo domain and the first Internet protocol domain to obtain a plurality of first addresses;

reversely resolving the second Helo domain and the second Internet protocol domain to obtain a plurality of second addresses; and determining whether one of the first addresses and the first Internet protocol address matches one of the second addresses and the second Internet protocol address.

6. The spam mail identifying method according to claim 5, wherein the step of determining whether one of the first addresses and the first Internet protocol address matches one of the second addresses and the second Internet protocol address comprises:

retrieving a plurality of first partial addresses from the first Internet protocol address and the first addresses respectively;

retrieving a plurality of second partial addresses from the second Internet protocol address and the second addresses respectively; and determining whether one of the first partial addresses matches one of the second partial addresses.

7. The spam mail identifying method according to claim 4, wherein the step of determining whether one of the pieces of the mail forwarding information of the i-th reference server matches one of the pieces of the mail receiving information of the (i−1)-th reference server comprises:

resolving the first Internet protocol address to obtain a first domain name;

resolving the second Internet protocol address to obtain a second domain name; and determining whether one of the first domain name, the first Helo domain, and the first Internet protocol domain matches one of the second domain name, the second Helo domain, and the second Internet protocol domain.

8. The spam mail identifying method according to claim 7, wherein the step of determining whether one of the first domain name, the first Helo domain, and the first Internet protocol domain matches one of the second domain name, the second Helo domain, and the second Internet protocol domain comprises:

retrieving a plurality of first base domain names from the first Helo domain, the first domain name, and the first Internet protocol domain respectively;

retrieving a plurality of second base domain names from the second Helo domain, the second domain name, and the second Internet protocol domain respectively; and determining whether one of the first base domain names matches one of the second base domain names.

9. The spam mail identifying method according to claim 3, further comprising defining that continuity exists between the i-th reference server and the (i−1)-th reference server if one of the pieces of the mail forwarding information of the i-th reference server matches one of the pieces of the mail receiving information of the (i−1)-th reference server; and identifying the mail as a normal mail if the continuity exists between any two consecutive reference servers of the reference servers.

10. A mail server, comprising:

a storage unit storing a plurality of modules; and a processing unit and a memory coupled to the storage unit and accessing and executing the modules, wherein the modules comprise:

a retrieving module retrieving a mail header of a mail when receiving the mail;

a first obtaining module obtaining a plurality of reference servers from a received line of the mail header, wherein each of the reference servers is a mail transfer agent server, and the reference servers transfer the mail according to a sequence;

a second obtaining module obtaining a plurality of pieces of mail forwarding information of a mail forwarding host and a plurality of pieces of mail receiving information of a mail receiving host of each of the reference servers;

a comparing module comparing the pieces of the mail forwarding information of an i-th reference server with the pieces of the mail receiving information of an (i−1)-th reference server of the reference servers, wherein i is a positive integer; and an identifying module identifying the mail as a spam mail if the pieces of the mail forwarding information of the i-th reference server are inconsistent from the pieces of the mail receiving information of the (i−1)-th reference server, wherein the first obtaining module is further configured to:

analyze the mail header to find all servers that forward the mail;

determine whether a subset exists in the received line, wherein the subset comprises a plurality of specific servers that belong to a same domain among the servers; and adopt one of the specific servers as a reference server that represents the specific servers if the subset exists in the received line.

11. The mail server according to claim 10, wherein the reference servers are all servers that forward the mail.

12. The mail server according to claim 10, wherein the comparing module is configured to:

determine whether one of the pieces of the mail forwarding information of the i-th reference server matches one of the pieces of the mail receiving information of the (i−1)-th reference server.

13. The mail server according to claim 12, wherein the pieces of the mail forwarding information of the i-th reference server comprise a first Helo domain, a first Internet protocol address, and a first Internet protocol domain of the mail forwarding host of the i-th reference server; and the pieces of the mail receiving information of the (i−1)-th reference server comprise a second Helo domain, a second Internet protocol address, and a second Internet protocol domain of the mail receiving host of the th (i−1)-th reference server.

14. The mail server according to claim 13, wherein the comparing module is configured to:

reversely resolve the first Helo domain and the first Internet protocol domain to obtain a plurality of first addresses;

reversely resolve the second Helo domain and the second Internet protocol domain to obtain a plurality of second addresses; and determine whether one of the first addresses and the first Internet protocol address matches one of the second addresses and the second Internet protocol address.

15. The mail server according to claim 14, wherein the comparing module is configured to:

retrieve a plurality of first partial addresses from the first Internet protocol address and the first addresses respectively;

retrieve a plurality of second partial addresses from the second Internet protocol address and the second addresses respectively; and determine whether one of the first partial addresses matches one of the second partial addresses.

16. The mail server according to claim 13, wherein the comparing module is configured to:

resolve the first Internet protocol address to obtain a first domain name;

resolve the second Internet protocol address to obtain a second domain name; and determine whether one of the first domain name, the first Helo domain, and the first Internet protocol domain matches one of the second domain name, the second Helo domain, and the second Internet protocol domain.

17. The mail server according to claim 16, wherein the comparing module is configured to:

retrieve a plurality of first base domain names from the first Helo domain, the first domain name, and the first Internet protocol domain respectively;

retrieve a plurality of second base domain names from the second Helo domain, the second domain name, and the second Internet protocol domain respectively; and determine whether one of the first base domain names matches one of the second base domain names.

18. The mail server according to claim 12, wherein the identifying module is configured to define that continuity exists between the i-th reference server and the (i−1)-th reference server if one of the pieces of the mail forwarding information of the i-th reference server matches one of the pieces of the mail receiving information of the (i−1)-th reference server; and identify the mail as a normal mail if the continuity exists between any two consecutive reference servers of the reference servers.

* * * * *